O. G. RIESKE.
CULTIVATOR.
APPLICATION FILED SEPT. 21, 1915.
1,276,270.
Patented Aug. 20, 1918.
2 SHEETS—SHEET 2.
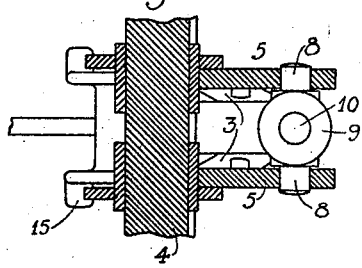
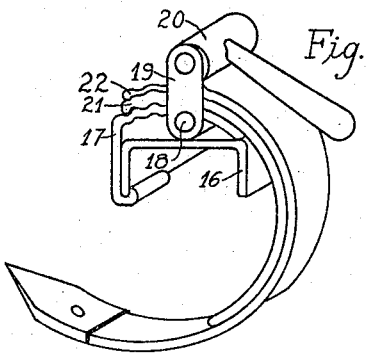
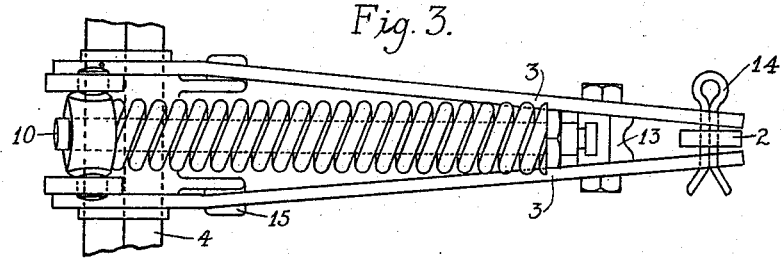
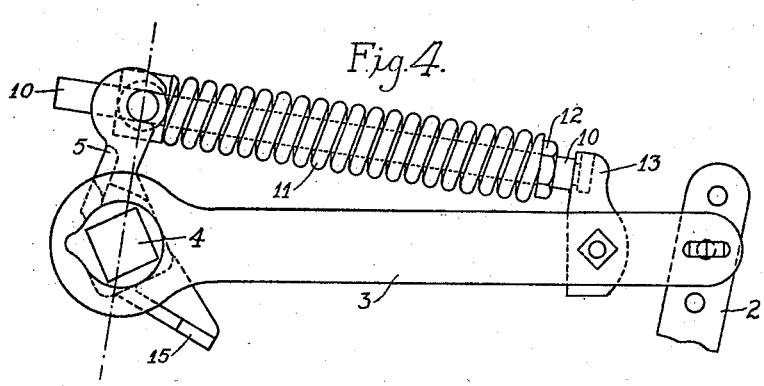
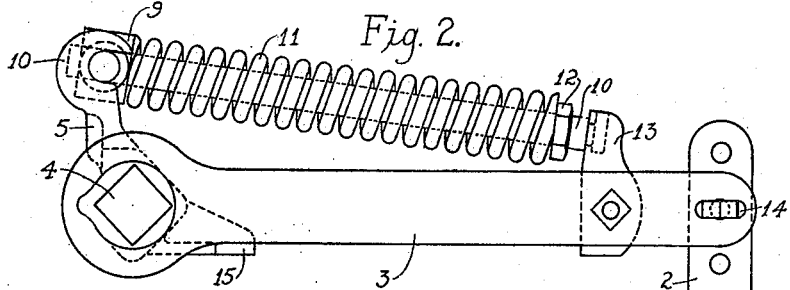
Witnesses.
Inventor.

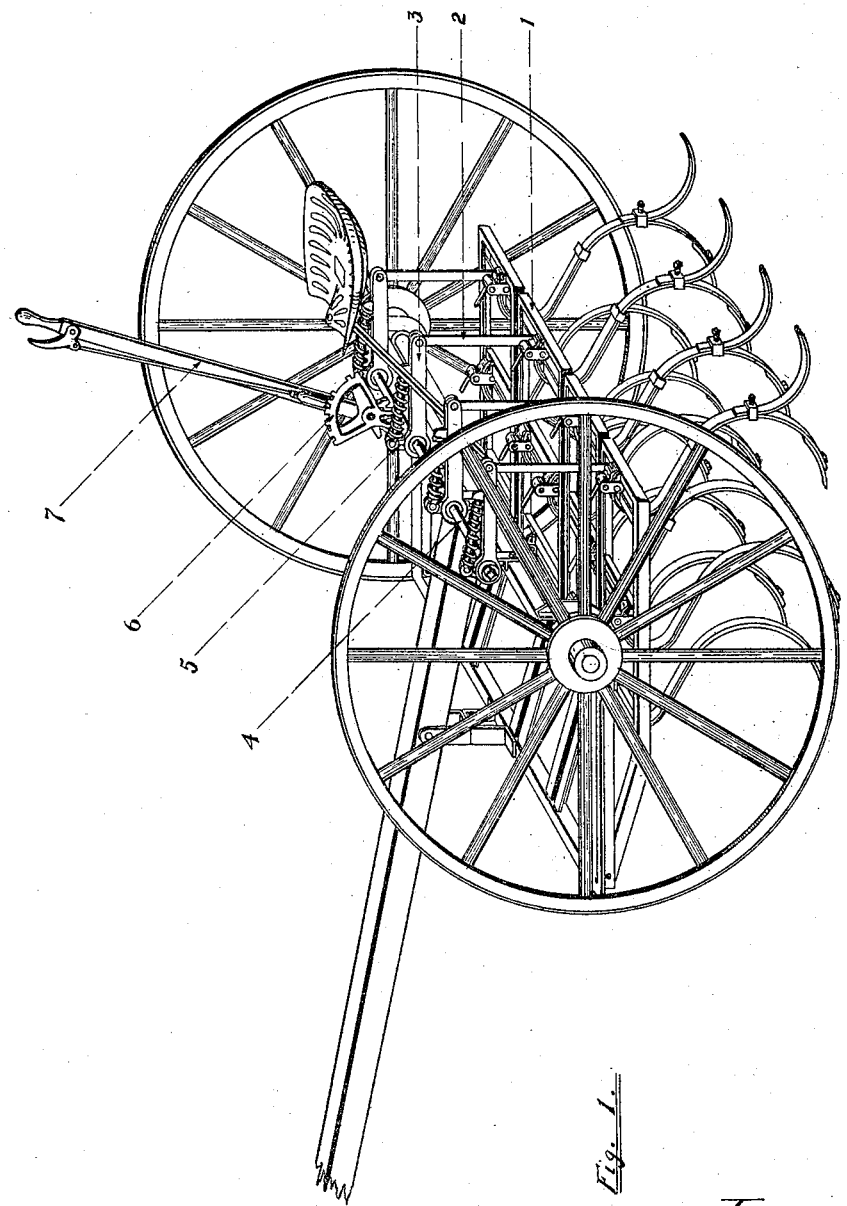

UNITED STATES PATENT OFFICE.

OTTO G. RIESKE, OF TORONTO, ONTARIO, CANADA, ASSIGNOR TO MASSEY-HARRIS COMPANY, LIMITED, OF TORONTO, CANADA.

CULTIVATOR.

1,276,270.  Specification of Letters Patent.  Patented Aug. 20, 1918.

Application filed September 21, 1915. Serial No. 51,903.

*To all whom it may concern:*

Be it known that I, OTTO G. RIESKE, of the city of Toronto, in the county of York, in the Province of Ontario, Canada, have invented certain new and useful Improvements in Cultivators, of which the following is a specification.

My invention relates to improvements in a cultivator in which cultivator teeth are carried by sections or frames pivotally connected to the forward part of the main frame carried by ground wheels, and the object is—

1. To provide a simple means for applying pressure to the sections which will be equable through a wide range of rise and fall in each section, and for raising the same out of action.

2. To provide a simple means for adjustably connecting the spring teeth to the frame of the cultivator sections.

With these objects in view, the invention consists of the details of construction hereinafter specifically described and then definitely claimed.

In the accompanying drawings:

Figure 1 is a perspective view of a cultivator equipped with my pressure spring and clamping device.

Fig. 2 is a side view of my pressure device for the cultivator sections.

Fig. 3 is a plan view of my pressure device.

Fig. 4 is a side view of my pressure spring in a position somewhat different from Fig. 2.

Fig. 5 is a perspective view of the spring tooth and connections.

Fig. 6 is a detailed sectional view of the pressure device.

In the drawings like numerals of reference indicate correponding parts in the different figures.

A cultivator section 1 is shown pivoted at its forward end to the main frame in the ordinary manner. The frame is made of flat iron or steel. The cross bars are set horizontally and securely fastened to the sides of the frame.

The rear cross bar of the section has a slot or hole cut therein. A connecting bar 2 has its lower end bent and suitably connected with the frame. The bar is turned up to a substantially vertical position.

A substantially horizontal link 3 is pivotally connected at one end to the upper portion of the connecting bar 2. Its other end is pivotally connected to rock shaft 4 in such a manner as to cause the connecting bar 2 to retain its substantially vertical position.

When the term "horizontal" or "vertical" is applied to these parts, it is not meant that they occupy this position in a strictly mathematical sense, but that their position generally more nearly approaches a horizontal or vertical position than an intermediate position.

The link 3 is made double to embrace the upper end of the connecting bar 2, and the pivot pin 14 operates in a short slot in the end of the connecting bar. The other end of the double link is pivotally connected with a bushing on arm 5 which is securely clamped to rock shaft 4.

The end of arm 5 is forked and hooked, and with the hooks are engaged the trunnions 8 to a guide 9. Through this guide passes the end of a rod 10 on which is placed a coil spring 11 which bears at one end against the guide 9, and at the other end against a collar 12 formed on or connected to the rod 10.

The end of the rod adjacent to the collar is threaded and fits into a hole formed in the lug 13 secured to the link 3.

The clamp 15 of the arm 5 has lugs formed thereon, adapted to engage the under side of the link 3 as hereinafter described.

The rock shaft is provided with hand lever 7 with its adjusting quadrant 6. It is evident that by moving the lever 7 that the rock shaft 4 may be rocked, and when the rock shaft 4 is rocked rearwardly the arm 5 also swings to the rear and compresses the coil spring 11. This causes a downward spring pressure on the link, and so, through the connecting bar to the section.

When the rock shaft 4 is rocked forwardly the arm 5 also swings to the front, and the lugs on the clamp 15 engage the under side of the link 3 and cause an upward pressure on the link, and so, through the connecting bar to the section.

Owing to the fact that the line of draft or tension of the spring is not in line with the connecting bar, the movement of the cultivator section in rising and falling on uneven ground results in a relatively small movement of contraction or expansion of the spring. From this it follows that the section may rise and fall to a considerable extent while the tension of the spring remains substantially equable. By operating the hand lever any desired spring pressure may be applied to the section.

The invention also designs to provide an important means of connecting the bent spring cultivator tooth 21 to the cross bar at 16 of the cultivator section.

A tooth seat 17 fits on top of the cross bar 16, and a plate 22 rests on top of the spring tooth, and these are connected by a suitable clamp 19.

The tooth seat 17 has traverse corrugations formed on it, which engage a rib or lug formed on the end of 21 which passes over the tooth seat 17 and under the plate 22 which has corrugations on its end.

The clamp 19 comprises 2 parallel strips of metal which are fastened at the lower end by a bolt 18 and at the upper end by an eccentric roller with a lever attached to 20.

The tooth seat 17 has an extension downward on the cross bar, and is shaped to hook under the rear lower edge of cross bar 16. The seat is thus given a better attachment to resist the twisting pull of the tooth. To adjust the spring teeth backward or forward it is merely necessary to raise the lever attached to 20 and loosen the clip and engage the lug or rib on the end of spring tooth 21 with the desired corrugations in seat 17 and then press down the handle of the lever.

Having thus described the invention, what I claim is new and desire to secure by Letters Patent is,—

1. In a cultivator the combination of the main frame; a cultivator frame or section pivoted at its forward end to the frame of a machine; a substantially vertical connecting bar pivotally connected at one end to the said section; a substantially vertical horizontal pivoted link adapted to retain the connecting bar in its vertical position; a coil spring adapted to exert a down pressure on the said connecting bar, and a means for changing the tension of the spring, substantially as described.

2. In a cultivator the combination of the main frame; a cultivator frame or section pivoted at its forward end to the frame of a machine; a substantially vertical connecting bar pivotally connected at one end to the said section; a rock shaft; a hook on the rock shaft; a link pivotally connected to the connecting bar and to the rock shaft adjacent to the hook on the rock shaft; a bolt, engaging the link and the hook on the rock shaft at or near its end; a spring adjacent the bolt; a means on the bolt to compress the spring to hold the link against upward movement.

3. In a cultivator the combination of the main frame; a cultivator frame or section pivoted at its forward end to the frame of a machine; a substantially vertical connecting bar pivotally connected at one end to the said section; a rock shaft; an upwardly extending arm on the rock shaft; a link pivotally connected to the connecting bar and to the rock shaft adjacent to the said arm; a guide carried by the arm at its outer end; a rod slidable in the said guide; a lug on the link with which one end of the rod is engaged; a collar on the rod adjacent to the said lug; a coil spring engaging the collar and the aforesaid guide, substantially as described.

4. In a cultivator the combination of the main frame; a cultivator frame or section pivoted at its forward end to the frame of a machine; a substantially vertical connecting bar pivotally connected at one end to the said section; a rock shaft; an upwardly extending arm on the rock shaft; a link pivotally connected to the connecting bar and to the shaft adjacent to the arm; an eye carried by said arm on its outer end; a rod having one end secured to the lug on the link and the opposite end slidably mounted in said eye, an adjusting nut on the rod on the end remote from the eye and a spring inserted on the rod between the eye and the nut; lugs on the rock shaft adapted to engage the under side of the link to raise the same, substantially as described.

5. In a cultivator the combination of the main frame; a cultivator frame or section pivoted at its forward end to the frame of a machine; a substantially vertical connecting bar pivotally connected at one end to the said section; a rock shaft; a link comprising two bars pivotally connected at the forward ends to the rock shaft on each side of said arm and converging rearwardly; a transverse lug engaged on each bar rearwardly of the center of gravity of the link and the rearward ends of said bars pivotally connected to the connecting bar; an eye carried by said arm on its outer end, a rod having one end secured to the lug on the link and the opposite end slidably mounted in said eye; an adjusting nut on the rod on the end remote from the eye and a spring inserted on the rod between the eye and the nut; lugs on the rock shaft adapted to engage the under side of the link to raise the same, substantially as described.

6. In a cultivator the combination of a cultivator frame; a bar secured thereto, having its back cut away to provide corrugations, a tooth having its end provided with a traverse rib coöperable with said corrugations, a second bar with its back bent to provide corrugations resting on said tooth; and actuating means for clamping the tooth and said bars as described.

7. In a cultivator the combination of a cultivator frame; having spaced angle cross bars; a bar secured thereto having its back cut away to provide corrugations, a tooth having its end provided with a traverse rib coöperable with said corrugations, a second bar with its back bent to provide corrugations resting on said bars, comprising two parallel plates connected at their ends by a rod adjacent to the cross bars and connected at their upper ends to an eccentric roller with lever attached as described.

8. In a cultivator the combination of a cultivator frame, having spaced angle cross bars; a tooth seat fitted at the top of the cross bars and having traverse corrugations thereon; a downward extension of the rear of the seat hooked under the rear edge of the rear cross bar; a tooth having its end provided with a rib adapted to engage the corrugations in the seat; a plate resting on top of the tooth and having traverse corrugations thereon; and means for clamping the plate and the tooth to its seat substantially as described.

9. In a cultivator the combination of a cultivator frame, a tooth seat secured thereto; a tooth having its end fitted on a seat; a plate resting on the tooth; means being provided whereby the tooth, the seat and the plate adjustably engage one another to resist the pull of the tooth; and means for clamping the tooth to the plate and to its seat substantially as described.

Dated at Toronto, in the county of York, this 1st day of September, A. D. 1915.

OTTO G. RIESKE.

Witnesses:
CHARLES McLEOD,
WILLIAM JOHN KERWIN.

Copies of this patent may be obtained for five cents each, by addressing the "Commissioner of Patents, Washington, D. C."